(12) United States Patent
O'Neil et al.

(10) Patent No.: US 11,209,059 B2
(45) Date of Patent: Dec. 28, 2021

(54) SEGMENTED INTEGRATED SLOT WEAR LINER WITH STRUCTURAL CARBON OR CERAMIC CORE

(71) Applicant: GOODRICH CORPORATION, Charlotte, NC (US)

(72) Inventors: Matthew R. O'Neil, Tipp City, OH (US); Eric Joseph Reed, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 47 days.

(21) Appl. No.: 16/352,467

(22) Filed: Mar. 13, 2019

(65) Prior Publication Data

US 2020/0292019 A1 Sep. 17, 2020

(51) Int. Cl.
*F16D 65/12* (2006.01)
*F16D 69/02* (2006.01)
(Continued)

(52) U.S. Cl.
CPC .......... *F16D 65/121* (2013.01); *F16D 55/36* (2013.01); *F16D 65/122* (2013.01); *F16D 69/02* (2013.01); *F16D 69/0408* (2013.01); *B64C 25/42* (2013.01); *F16D 2065/134* (2013.01); *F16D 2065/1312* (2013.01); *F16D 2065/1324* (2013.01); *F16D 2069/0433* (2013.01); *F16D 2200/0021* (2013.01); *F16D 2200/0052* (2013.01); *F16D 2250/0084* (2013.01)

(58) Field of Classification Search
CPC ................ F16D 65/121; F16D 65/122; F16D 2065/1312; F16D 2065/1324; F16D 2065/134; F16D 2065/1356; F16D 2065/1392; F16D 69/04; F16D 69/0408; F16D 2069/0425; F16D 2069/0433; F16D 2069/0441; F16D 65/123
See application file for complete search history.

(56) References Cited

U.S. PATENT DOCUMENTS

| | | | | |
|---|---|---|---|---|
| 1,625,933 A | * | 4/1927 | Bing | ........................ F16D 13/64 192/107 R |
| 2,016,280 A | * | 10/1935 | Gatke | ................. F16D 69/0416 188/234 |

(Continued)

FOREIGN PATENT DOCUMENTS

| | | | | |
|---|---|---|---|---|
| AT | 379666 B | * | 2/1986 | ........... F16D 65/128 |
| DE | 102017121751 A1 | * | 3/2019 | ........... F16D 65/123 |

(Continued)

OTHER PUBLICATIONS

European Patent Office, European Search Report dated May 19, 2020 in Application No. 19214423.6.

*Primary Examiner* — Thomas J Williams
(74) *Attorney, Agent, or Firm* — Snell & Wilmer L.L.P.

(57) ABSTRACT

A friction disk includes a friction disk core having a first surface with multiple channels extending radially across the first surface. The friction disk may further include a first wear liner having two wear liner segments each configured to be coupled to the first surface of the friction disk core to form an annular liner and each including a wear surface, a non-wear surface, and a rib extending from the non-wear surface and configured to be received by one of the multiple channels.

20 Claims, 7 Drawing Sheets

(51) Int. Cl.
*F16D 55/36* (2006.01)
*F16D 69/04* (2006.01)
*B64C 25/42* (2006.01)
*F16D 65/02* (2006.01)

(56) References Cited

U.S. PATENT DOCUMENTS

| | | | | |
|---|---|---|---|---|
| 3,295,640 | A * | 1/1967 | Beuchle | F16D 55/32 |
| | | | | 188/218 A |
| 3,724,613 | A * | 4/1973 | Bermingham | F16D 69/027 |
| | | | | 188/218 XL |
| 3,917,043 | A | 11/1975 | Bok | |
| 3,932,568 | A * | 1/1976 | Watts | C04B 35/532 |
| | | | | 264/29.7 |
| 3,936,552 | A * | 2/1976 | Krupp | C04B 35/83 |
| | | | | 428/66.2 |
| 4,108,286 | A * | 8/1978 | Gagarin | F16D 65/123 |
| | | | | 188/218 XL |
| 4,132,294 | A * | 1/1979 | Poli | F16D 65/123 |
| | | | | 188/218 XL |
| 5,150,774 | A * | 9/1992 | Adamson | F16D 65/124 |
| | | | | 188/218 XL |
| 5,709,288 | A | 1/1998 | Riebe | |
| 5,779,006 | A | 7/1998 | Hyde et al. | |
| 6,439,353 | B2 | 8/2002 | Roloff et al. | |
| 7,090,057 | B2 | 8/2006 | Fryska et al. | |
| 8,281,907 | B2 | 10/2012 | Fryska et al. | |
| 8,408,369 | B2 * | 4/2013 | Woychowski | F16D 65/12 |
| | | | | 188/218 XL |
| 9,709,108 | B2 * | 7/2017 | Wurth | F16D 65/125 |
| 10,066,691 | B2 * | 9/2018 | Jones | F16D 65/123 |
| 10,094,439 | B2 | 10/2018 | Charles et al. | |
| 2006/0016646 | A1 * | 1/2006 | Banks | F16D 65/122 |
| | | | | 188/218 XL |
| 2012/0255820 | A1 | 10/2012 | McCord et al. | |
| 2018/0252284 | A1 * | 9/2018 | Charles | B64C 25/42 |
| 2019/0017562 | A1 | 1/2019 | Fiala et al. | |
| 2020/0300324 | A1 * | 9/2020 | O'Neil | F16D 65/127 |

FOREIGN PATENT DOCUMENTS

| | | | |
|---|---|---|---|
| EP | 3372862 | 9/2018 | |
| GB | 306927 A * | 8/1929 | F16D 69/04 |

* cited by examiner

SEGMENTED INTEGRATED SLOT WEAR LINER WITH STRUCTURAL CARBON OR CERAMIC CORE

FIELD

The present disclosure relates to braking systems, and more specifically to wear liners for friction disks of aircraft braking systems.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. Current disk assemblies may comprise replaceable wear liners coupled to a reusable core. The liner may be attached to the core via a flange disposed at either an outer diameter of the liner for rotor assemblies or an inner diameter of the liner for stator assemblies. Attaching the liners via a flange can present torque transfer problems, particularly, when the liner is in a worn state. Additionally, use of a single piece wear liner may have drawbacks such as experiencing warping. Additionally, manufacturing a single piece wear liner may be relatively wasteful as an entire disk may be formed and then the center of the disk may be removed, such that the center disk of the wear liner is wasted.

SUMMARY

Described herein is a friction disk that includes a friction disk core having a first surface with multiple channels extending radially across the first surface. The friction disk may further include a first wear liner having two wear liner segments each configured to be coupled to the first surface of the friction disk core to form an annular liner and each including a wear surface, a non-wear surface, and a rib extending from the non-wear surface and configured to be received by one of the multiple channels.

Any of the foregoing embodiments may further include a second wear liner having identical features as the first wear liner and configured to be coupled to a second surface of the friction disk core.

Any of the foregoing embodiments may further include at least two fasteners each configured to extend through the friction disk core and respective segments of the first wear liner and the second wear liner.

In any of the foregoing embodiments, sidewalls of the rib are substantially perpendicular to the first non-wear surface.

In any of the foregoing embodiments, a circumferential dimension of the rib decreases from an outer diameter of the first wear liner towards an inner diameter of the first wear liner.

In any of the foregoing embodiments, the friction disk core includes a first material, and the first wear liner comprises a second material that may be different from the first material.

In any of the foregoing embodiments, the friction disk core is a rotor core.

In any of the foregoing embodiments, the friction disk core is a stator core.

In any of the foregoing embodiments, the first wear liner includes at least three wear liner segments.

Also disclosed is a friction disk that includes a friction disk core having a first surface and a second surface and including multiple channels extending radially across the first surface and the second surface. The friction disk may further include a first wear liner configured to be coupled to the first surface of the friction disk core. The friction disk may further include a second wear liner configured to be coupled to the second surface of the friction disk core. The first wear liner and the second wear liner each include at least two wear liner segments that form an annular liner when coupled to the friction disk core, each of the two wear liner segments including a wear surface, a non-wear surface, and a rib extending from the non-wear surface and configured to be received by one of the multiple channels.

Any of the foregoing embodiments may further include at least two fasteners each configured to extend through the friction disk core and respective segments of the first wear liner and the second wear liner.

In any of the foregoing embodiments, sidewalls of the rib are substantially perpendicular to the first non-wear surface.

In any of the foregoing embodiments, a circumferential dimension of the rib decreases from an outer diameter of the first wear liner towards an inner diameter of the first wear liner.

In any of the foregoing embodiments, the friction disk core includes a first material, and the first wear liner comprises a second material that is different from the first material.

In any of the foregoing embodiments, the friction disk core is a rotor core.

In any of the foregoing embodiments, the friction disk core is a stator core.

Also disclosed is a multi-disk brake system that includes a plurality of rotors configured to rotate about an axis. The multi-disk brake system may further include a plurality of stators configured to remain stationary relative to the axis. At least one of the plurality of rotors or the plurality of stators includes: a friction disk core having a first surface with multiple channels extending radially across the first surface, and a first wear liner having two wear liner segments each configured to be coupled to the first surface of the friction disk core to form an annular liner and each including a wear surface, a non-wear surface, and a rib extending from the non-wear surface and configured to be received by one of the multiple channels.

Any of the foregoing embodiments may further include a second wear liner having identical features as the first wear liner and configured to be coupled to a second surface of the friction disk core; and at least two fasteners each configured to extend through the friction disk core and respective segments of the first wear liner and the second wear liner.

In any of the foregoing embodiments, a circumferential dimension of the rib decreases from an outer diameter of the first wear liner towards an inner diameter of the first wear liner.

In any of the foregoing embodiments, the friction disk core includes a first material, and the first wear liner comprises a second material that is different from the first material.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
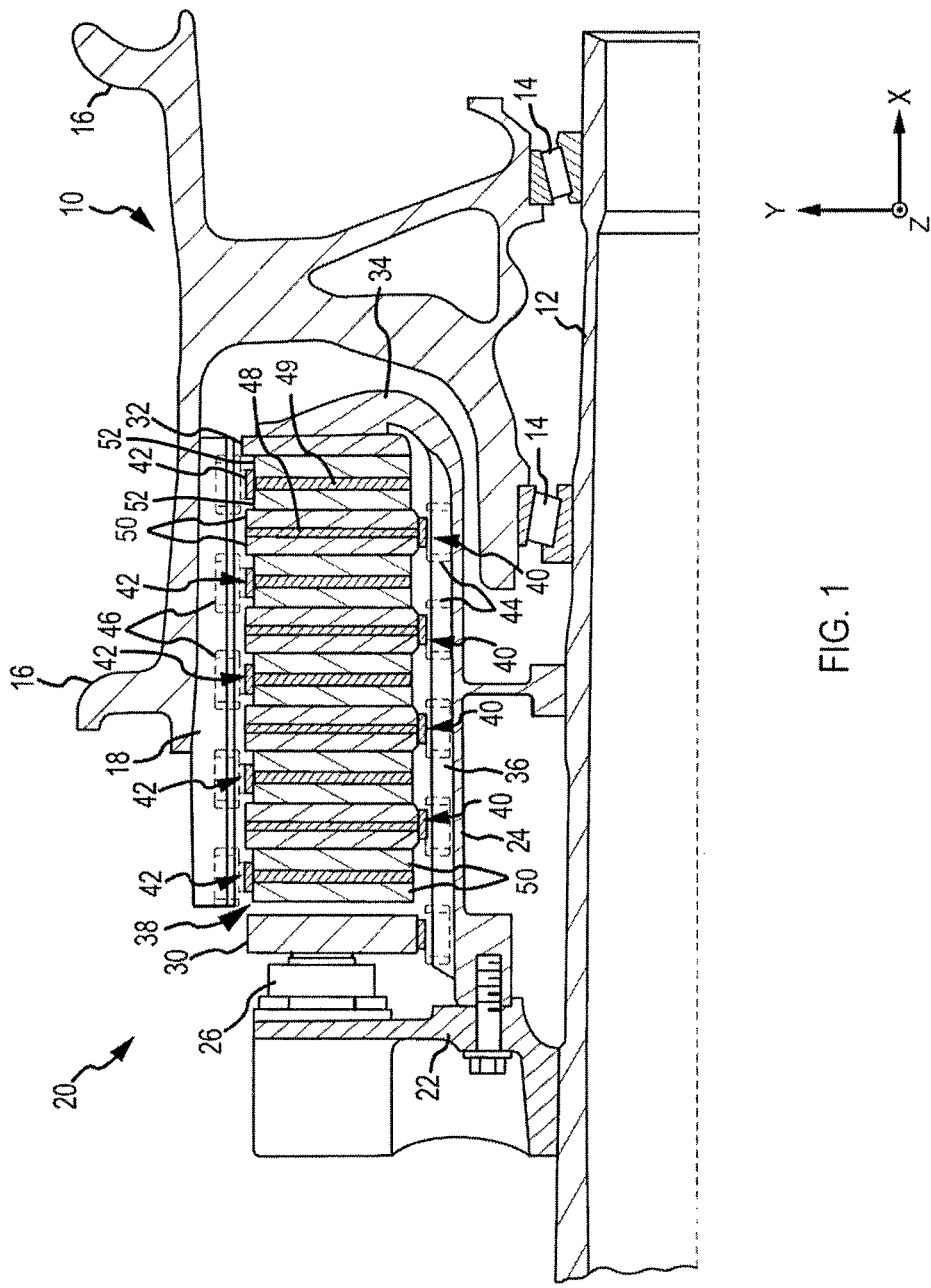
FIG. 1 illustrates a cross-sectional view of a multi-disk brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, are segmented wear liners for friction disks (e.g., rotors and stators) of a braking system. The friction disks may include a friction disk core with wear liners coupled to the friction disk core. As described in greater detail below, the wear liner may be segmented and may include a plurality of integrated torque ribs that protrude from a non-wear surface of the wear liner. The wear liners may be coupled to the friction disk core via a fastener and may be positioned to provide frictional contact with adjacent friction disks during braking. The wear liners may be used for rotor and stator friction disks. In other words, the wear liners may be compatible with both rotor cores and stators cores. The interchangeability of the wear liners may simplify the friction disk manufacturing process and/or increase output by reducing assembly time. Additionally, the integrated torque ribs may allow a greater portion of the wear liner to be utilized thereby reducing material waste. The segments of the wear liners may be identical, further easing the manufacturing process. Furthermore, identical wear liner segments may be used for both rotor cores and stator cores. Because the wear liners are segmented (as opposed to being a single, annular structure) warping of the wear liners may be reduced, which occurs when non-segmented wear liners are used in a disk brake system. The segmented aspect of the wear liners further reduces waste during the manufacturing process because the wear liner segments may be manufactured without waste (as opposed to non-segmented wear liners which are formed as a disk, then cut to form the annular shape).

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 52. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2A:
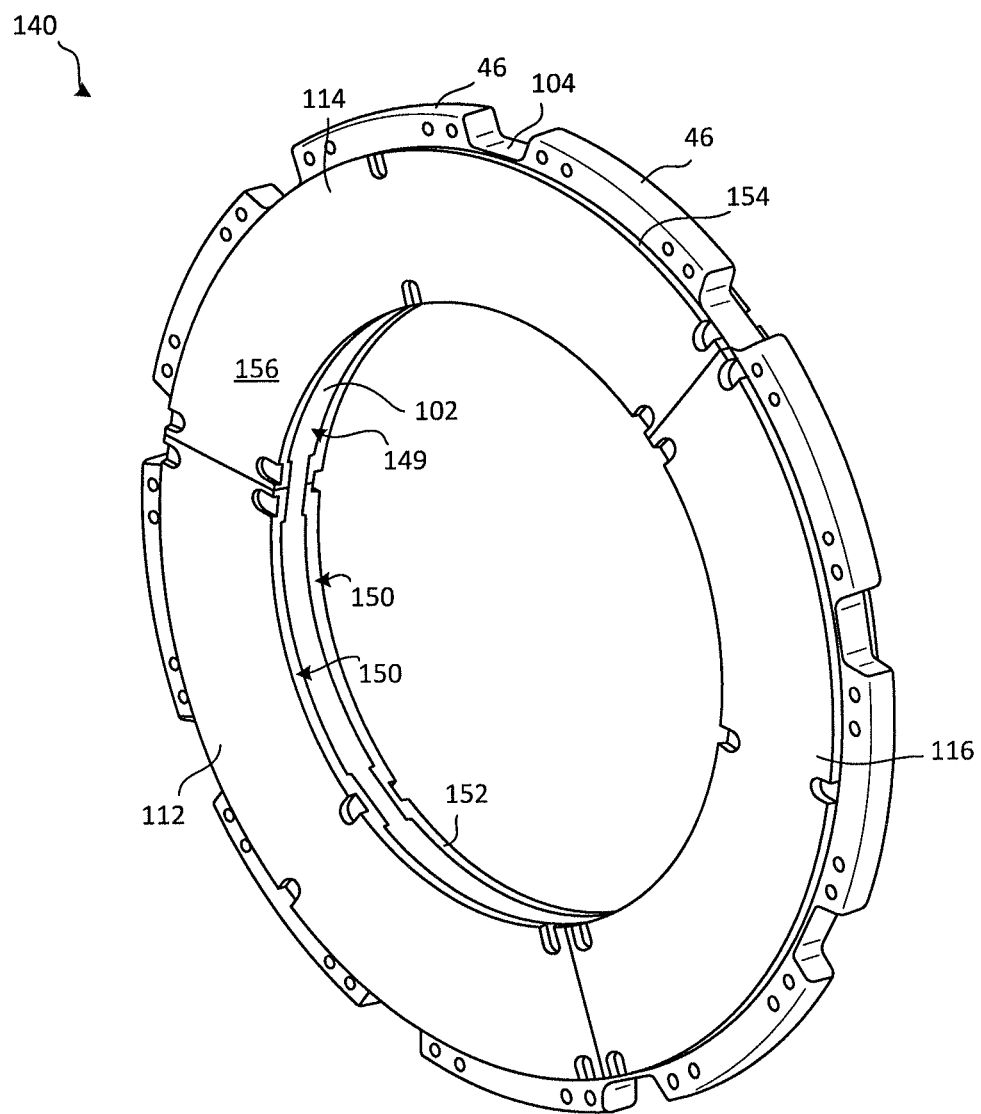
FIG. 2A illustrates a perspective view of a friction disk having wear liners disposed on opposing surfaces of the friction disk core, according to various embodiments.

FIG. 2A illustrates a perspective view of a friction disk 140 having segmented wear liners 150 disposed on opposing surfaces of the friction disk core 149, according to various embodiments. Friction disk 140 may be a stator or a rotor, such as stator 48 or rotor 49 described above with reference to FIG. 1. In various embodiments, wear liners 150 may be replaceable, such that after wear liners 150 have been worn below a suitable operational thickness, wear liners 150 may be removed from friction disk core 149 and replaced by new or remanufactured wear liners. As mentioned above, wear liners 150 may be segmented wear liners. In that regard, wear liners 150 may include any quantity of segments such as 2 segments, 3 segments (as shown), 4 segments, or the like. Wear liners 150 may include a first segment 112, a second segment 114, and a third segment 116. When coupled to friction disk core 149, segments 112, 114, 116 may together form an annular structure used as wear liner 150.

Figure 3:
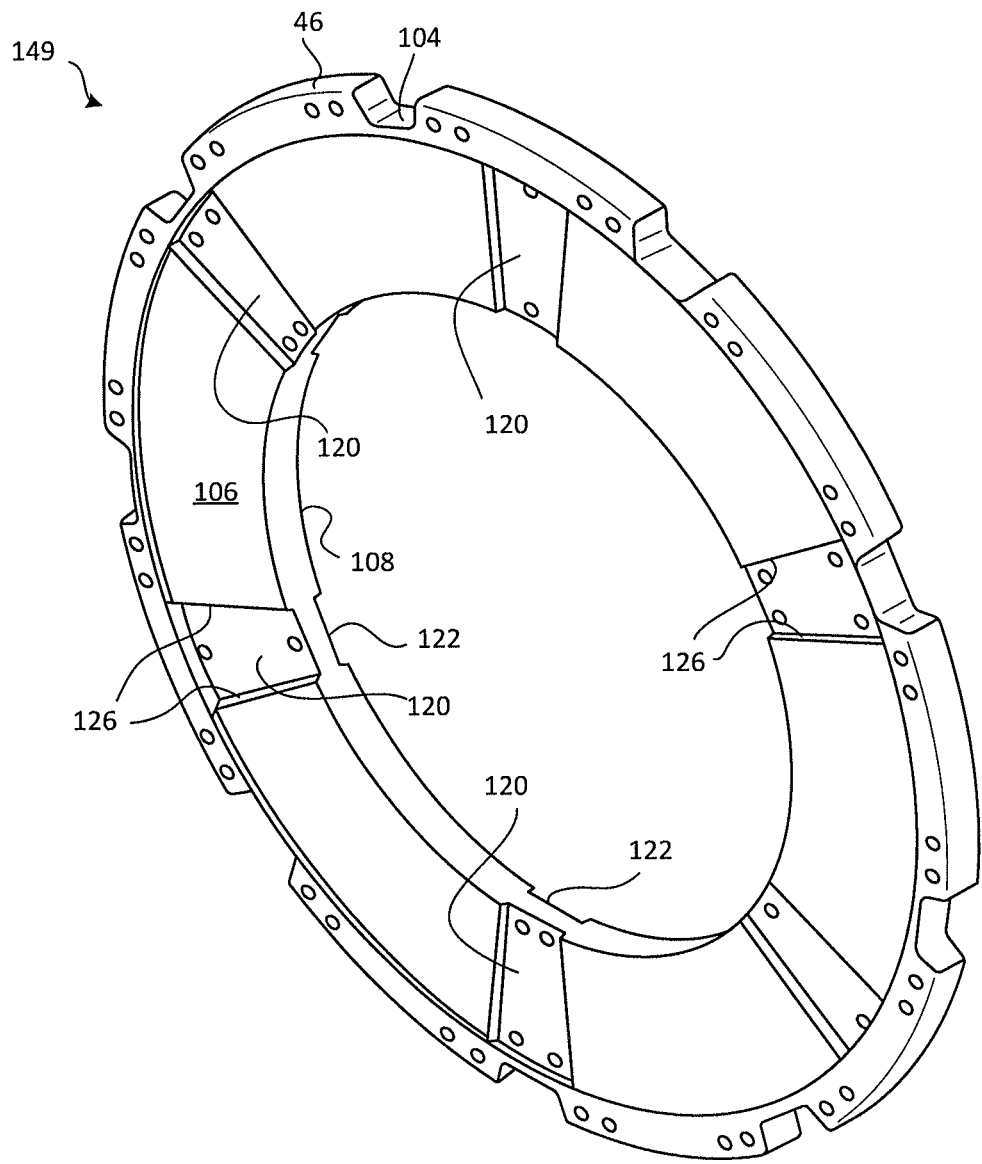
FIG. 3 illustrates a perspective view of a friction disk core define a plurality of channels for receiving a corresponding plurality of torque ribs of a wear liner, according to various embodiments.
Figure 4A:
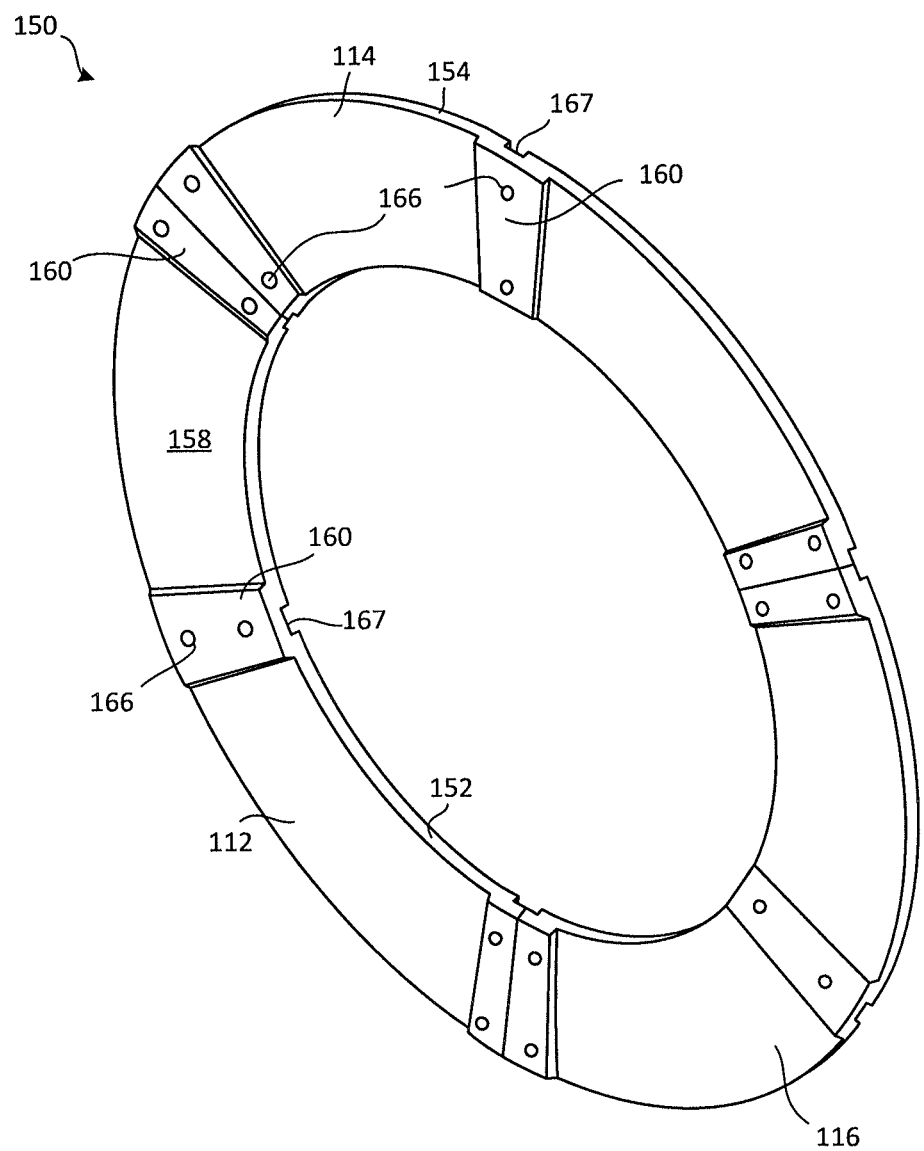
FIG. 4A illustrates a perspective view of a wear liner showing a non-wear surface of the wear liner having a plurality of torque ribs, according to various embodiments.

In various embodiments, and with momentary reference to FIGS. 3 and 4A, wear liners 150 include ribs 160 (FIG. 4A) that are configured to be received into corresponding (e.g., complementary) channels 120 (FIG. 3) of the friction disk core 149. That is, the friction disk 140 in an installed state includes at least one wear liner 150 coupled to the friction disk core 149, with the at least one rib 160 of the wear liner 150 received within the at least one channel 120 of the friction disk core 149. Fasteners may extend through the ribs/channels, as described in greater detail below. Generally, the added material of the ribs 160 enables a greater volume of wear liners 150 to be consumed (i.e. used, worn) prior to replacement, as compared to wear liners which may be attached at a flange and/or which do not include ribs 160. In various embodiments, between 50% and 70% of a total material volume of unworn wear liners 150 may be consumed prior to wear liners 150 being replaced. In various embodiments, between 55% and 65% of the total material volume of unworn wear liners 150 may be consumed prior to wear liners 150 being replaced.

Returning to reference FIG. 2A, friction disk core 149 and wear liners 150 may comprise different materials. For example, in various embodiments, friction disk core 149 may comprise a first material (e.g., steel) and wear liners 150 may comprise a second material (e.g., a carbon composite material). In various embodiments, friction disk core 149 and wear liners 150 may comprise the same material, such as a carbon composite material. In various embodiments, the material of friction disk core 149 may be selected for its structural properties, thermal conductivity, heat capacity, and/or oxidation resistance properties. For example, friction disk core 149 may comprise silicon carbide or titanium. In various embodiments, a material of wear liners 150 may be selected for its wear resistance and/or frictional properties. Thus, friction disk 140 may contain the structural advantages of friction disk core 149 and the frictional advantages of wear liners 150.

Figure 2B:
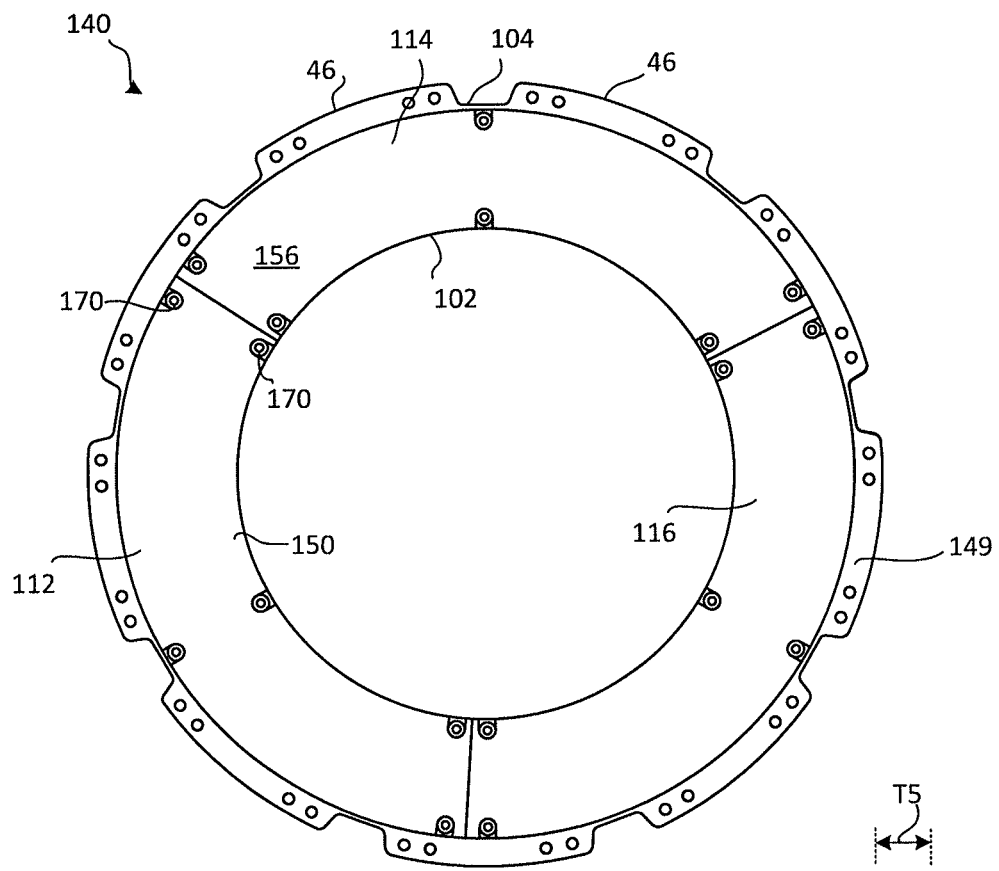
FIG. 2B illustrates a plan view of a wear liner disposed on a friction disk core, with fasteners coupling the wear liner to the friction disk core, according to various embodiments.

With reference to FIGS. 2A and 2B, friction disk core 149 may comprise a rotor spine and rotor lugs 46. Friction disk core 149 may engage rotor splines 18 (FIG. 1) in rotor gaps formed between rotor lugs 46. Thus, friction disk 140 may be rotatable by virtue of the engagement between rotor lugs 46 of friction disk core 149 and rotor splines 18 of wheel 10 (FIG. 1). Friction disk core 149 may comprise an inner circumferential surface 102 and an outer circumferential surface 104 radially outward of inner circumferential surface 102. Rotor lugs 46 may be extend from outer circumferential surface 104. With momentary reference to FIG. 3, friction disk core 149 further comprises a first surface 106 and a second surface 108 opposite first surface 106. First surface 106 and second surface 108 may extend along rotor spine 110 between inner circumferential surface 102 and outer circumferential surface 104.

Figure 2C:
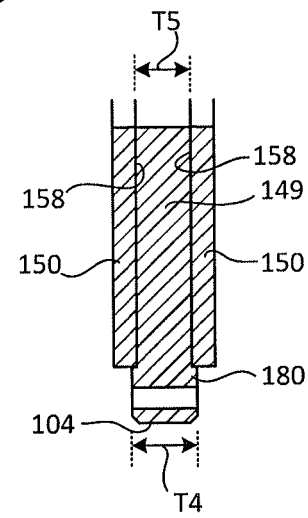
FIG. 2C illustrates a partial cross-sectional view of a friction disk having wear liners disposed on opposing surfaces of the friction disk core, according to various embodiments.

In various embodiments, and with reference to FIG. 2C, Friction disk core 149 may comprise a thickness T5 along the contact area with non-wear surface 158 of wear liners 150. Friction disk core 149 may comprise a thickness T4 at outer circumferential surface 104 and rotor lugs 46. In various embodiments, thickness T4 may be greater than thickness T5. Stated another way, a portion 180 of friction disk core 149 that is radially outward of wear liners 150 and proximate to outer circumferential surface 104 and rotor lugs 46 may comprise a thickness T4 that is greater than the thickness T5 of a radially inward portion of friction disk core 149 that is in contact with wear liners 150. In various embodiments, thickness T5 of friction disk core 149 may be between 0.30 inches and 1.0 inches (i.e., between 0.76 cm and 2.54 cm). In various embodiments, thickness T5 of friction disk core 149 may be between 0.40 inches and 0.75 inches (i.e., between 1.02 cm and 1.91 cm). In various embodiments, thickness T5 of friction disk core 149 may be between 0.50 inches and 0.60 inches (i.e., between 1.27 cm and 1.52 cm).

FIG. 3 illustrates a perspective view of friction disk core 149 having a plurality of channels 120 for receiving a corresponding plurality of ribs 160 (FIG. 4A) of wear liner 150, according to various embodiments. That is, a plurality of first channels 120 may be formed in, and defined by, first surface 106 of the friction disk core 149. A plurality of second channels 122 may be formed in, and defined by, second surface 108 of the friction disk core 149. In various embodiments, the channels 120, 122 are recesses or depressions formed in the surface of the friction disk core 149 that is configured to face/engage the non-wear surface of the wear liners. In various embodiments, the channels 120, 122 are circumferentially distributed and are configured to be aligned with corresponding/complementary ribs 160 of the wear liners 150. This engagement between ribs 160 and channels 120 may facilitate torque transfer between the friction disk core 149 and the wear liners 150.

In various embodiments, the channels 120, 122 may be axially aligned, as shown in FIG. 3. In various embodiments, however, the channels 120, 122 may be spaced apart from each other (i.e., the channels 120, 122 may fail to be axially aligned) in order to avoid having a section of the friction disk core 149 having a thickness that is reduced by the axial lengths of both channels 120, 122.

Each channel 120, 122 may be formed partially through friction disk core 149 such that a portion of friction disk core 149 remains between a bottom, or axially inward, surface of the channels 120, 122. Stated differently, a depth of first channels 120 and a depth of second channels 122 may be selected such that a portion of friction disk core 149 remains between axially aligned first channels 120 and second channels 122. In various embodiments, the circumferential positions of the first channels 120 are aligned with the circumferential positions of the second channels 122. In various embodiments, the depth of the first channels 120 may be about equal to the depth of second channels 122.

With continued reference to FIG. 3, first channels 120 and second channels 122 may extend radially. That is, sidewalls 126 of the channels 120, 122 may extend along or may be parallel to radii of the friction disk core 149. Accordingly, first channels 120 and second channels 122 may have a generally tapering or converging shape along a radially inward direction. The sidewalls of the channels 120, 122 may extend substantially axially, and thus may be substantially perpendicular to the first and second surfaces 106, 108 of the friction disk core 149. In various embodiments, sidewalls 126 of first channels 120 and second channels 122 may be sloped. For example, sidewalls 126 may be formed at angle between 91 degrees and 155 degrees relative to the first and second surfaces 106, 108 of the friction disk core 149.

Figure 4B:
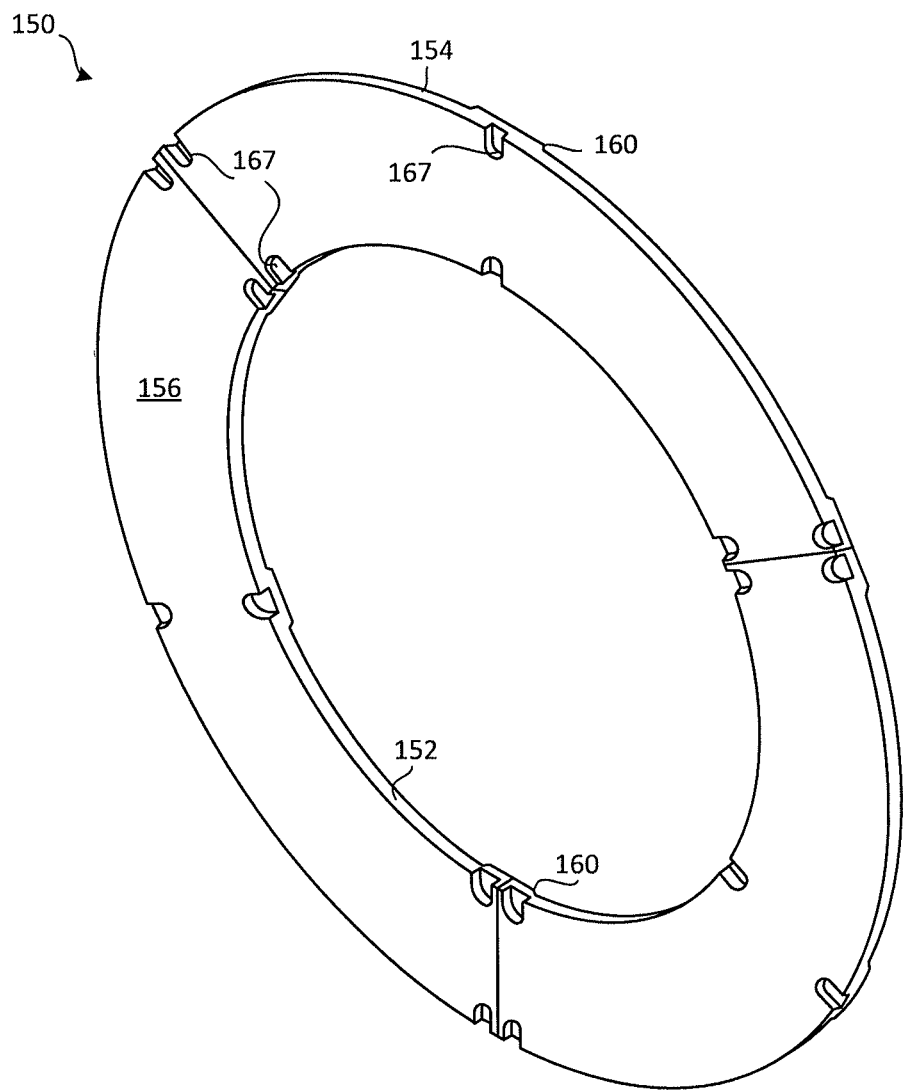
FIG. 4B illustrates a perspective view of a wear liner showing a wear surface of the wear liner, according to various embodiments.

In various embodiments, and with reference to FIGS. 4A and 4B, the ribs 160 of wear liners 150 are shown. The wear liners 150 may comprise an inner circumferential surface 152 and an outer circumferential surface 154 radially outward of inner circumferential surface 152. Wear liners 150 may further include a wear surface 156 (FIG. 4B) and a non-wear surface 158 (FIG. 4A) opposite wear surface 156. Wear surface 156 may be substantially planar, or flat, and may extend from inner circumferential surface 152 to outer circumferential surface 154. Non-wear surface 158 may extend from inner circumferential surface 152 to outer circumferential surface 154 and may be oriented toward friction disk core 149.

Non-wear surface 158 may include a plurality of ribs 160, also referred to herein as torque ribs. Torque ribs 160 (also referred to as protrusions) may extend (i.e., protrude) from non-wear surface 158 in an axial direction toward friction disk core 149. Rib 160 may be integrally formed as part of the wear liner segments 112, 114, 116. Ribs 160 may extend generally radially, and thus sidewalls of the ribs 160 may extend along or be parallel with radii of the wear liner. That is, a circumferential dimension of the ribs 160 may taper or converge along a radially inward direction (e.g., from the outer circumferential surface 154 to the inner circumferential surface 152). Further, sidewalls of ribs 160 may complement the sidewalls 126 of channels 120 in terms of their orientation/shape. The ribs 160 may be circumferentially distributed around the wear liner 150. In various embodiments, the number, size, and distribution of ribs 160 may be selected according to the specifics of a given implementation in order to improve torque transfer and/or minimize vibrations. Further, the ribs 160 may impart additional structural integrity/rigidity to the wear liner segments 112, 114, 116, thus reinforcing and otherwise providing mechanical stiffness to the wear liners 150.

Figure 4C:
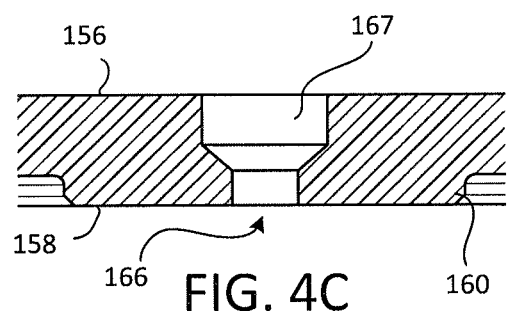
FIG. 4C illustrates a partial cross-sectional view of a wear liner, showing a counterbore opening for receiving a fastener therethrough, according to various embodiments.

In various embodiments, and with reference to FIGS. 4A, 4B, and 4C, openings 166 may be formed through the one or more ribs 160. In particular, openings 166 may be located on ribs 160 of segments 112, 114, 116. In some embodiments, openings 166 may be located towards circumferential edges of segments 112, 114, 116 (i.e., within 2 degrees, or 5 degrees, or 10 degrees, or 20 degrees circumferentially of the circumferential edges of segments 112, 114, 116). In some embodiments, openings 166 may also be located at other circumferential locations. Openings 166 may further be located towards the outer diameter edge and inner diameter edge of segments 112, 114, 116 (i.e., such as within 5 percent, or 10 percent, or 15 percent of the radial dimension of segments 112, 114, 116).

As shown, segments 112, 114, 116 are separated along ribs 160. However, in some embodiments, segments 112, 114, 116 may be separated at locations between ribs 160 instead. In that regard, openings 166 may be located on ribs 160 (as shown in FIG. 4A) or at locations other than ribs 160.

Openings 166 are pass-through holes or pass-through apertures that extend completely through wear liner 150 from wear surface 156 to non-wear surface 158. The openings 166 are configured to receive a fastener 170 (FIG. 2B), such as a rivet, bolt, pin, screw, or other suitable securement mechanism. In various embodiments, openings 166 may also include a counterbore 167 defined in the wear surface 156. In various embodiments, the diameter of opening 166 proximate wear surface 156 (e.g., the counterbore 167) may be greater than the diameter of the opening 166 proximate non-wear surface 158 of the wear liner 150. Because of the added material forming the rib 160, the wear liner 150 has sufficient space to form counterbore 167. Further, the counterbore 167 provides a shoulder against which a head of a fastener may be seated and allows for the head of the fastener to be recessed relative to the wear surface 156. That is, locating openings 166 for the fasteners 170 (FIG. 2B) through the ribs 160 may allow the heads of fasteners 170 to be located/depressed a greater distance from wear surface 156. In this regard, the heads of fasteners 170 may remain recessed with respect to wear surface 156 of wear liners 150 for a greater period of time, thus enabling an increased volume of material of wear liner 150 to be consumed before wear liner replacement is warranted.

In various embodiments, and with reference to FIGS. 2A and 2B, an assembled friction disk 140, including wear liners 150 coupled to friction disk core 149, includes fasteners 170 that extend between opposing wear liners 150 and may couple wear liner segments 112, 114, 116 to friction disk core 149. Wear surface 156 of wear liners 150 may be oriented away from friction disk core 149. Outer circumferential surface 154 of wear liners 150 may be disposed radially inward from outer circumferential surface 104 and rotor lugs 46 of friction disk core 149.

In various embodiments, each wear segment 112, 114, 116 may have an identical or substantially similar configuration. This reduces cost of manufacturing as a single manufacturing process may be employed to form each wear liner segment for use in a disk brake. In various embodiments, while friction disk core 149 is shown and described as a rotor, a similar/corresponding configuration of wear liners with ribs may be implemented for a stator. In such embodiments, wear liner segments 112, 114, 116 may be interchangeable between rotors and stators (e.g. rotor 49 and stator 48 of FIG. 1) because the coupling of the wear liners is independent of rotor lugs 46 and stator lugs. Accordingly, the wear liners 150 may be compatible with both rotors and stators, and thus the manufacturing process and inventory system for friction disks may be simplified, thus resulting in potentially higher manufacturing output and/or reduced assembly time.

Figure 5:
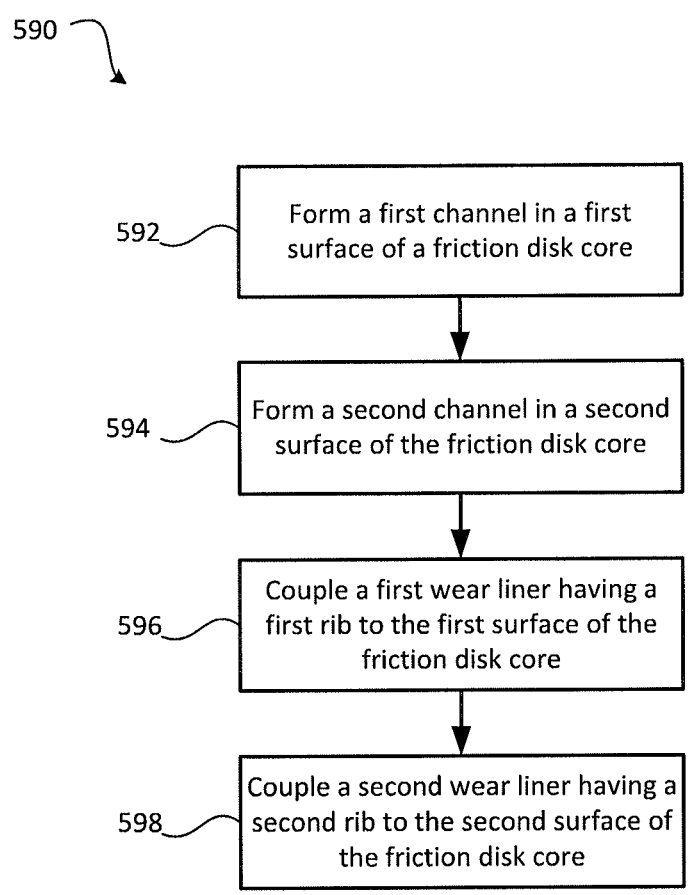
FIG. 5 is a schematic flow chart diagram of a method of making a friction disk, in accordance with various embodiments.

In various embodiments, and with reference to FIG. 5, a schematic flow chart diagram of a method 590 of making a friction disk is provided. The method 590 may include Ruining a first channel in a first surface of a friction disk core at step 592 and forming a second channel in a second surface of a friction disk core at step 594. The method 590 may further include coupling wear liner segments of a first wear liner having a first rib to the first surface of the friction disk core at step 596 and coupling wear liner segments of a second wear liner having a second rib to the second surface of the friction disk core at step 598. In various embodiments, steps 596 and 598 include aligning corresponding ribs with corresponding channels and inserting the ribs within the channels. Further, steps 596 and 598 may include disposing a fastener through the first rib, the first channel, the second channel, and the second rib to attach wear liner segments of both wear liners to the core.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
   a friction disk core having a first surface and a second surface with multiple channels extending radially across the first surface and the second surface, the multiple channels including first channels extending across the first surface and second channels extending across the second surface, the first channels being axially misaligned with the second channels;
   a first wear liner having an inner circumferential surface, an outer circumferential surface, and at least two wear liner segments each configured to be coupled to the first surface of the friction disk core to form an annular liner and each including a wear surface, a non-wear surface, and a rib extending from the non-wear surface from the inner circumferential surface to the outer circumferential surface, the rib defining at least one counterbore and configured to be received by one of the multiple channels; and
   a plurality of fasteners each configured to extend through the at least one counterbore of the rib of a respective wear liner segment of the at least two wear liner segments to couple the respective wear liner segment to the friction disk core.

2. The friction disk of claim 1, further comprising a second wear liner having identical features as the first wear liner and configured to be coupled to the second surface of the friction disk core.

3. The friction disk of claim 1, wherein each of the multiple channels is defined by sidewalls that have a converging shape along a radially inward direction of the friction disk core.

4. The friction disk of claim 1, wherein sidewalls of the rib are substantially perpendicular to a first non-wear surface.

5. The friction disk of claim 4, wherein a circumferential dimension of the rib decreases from an outer diameter of the first wear liner towards an inner diameter of the first wear liner.

6. The friction disk of claim 1, wherein the friction disk core includes a first material, and the first wear liner comprises a second material that is different from the first material.

7. The friction disk of claim 1, wherein the friction disk core is at least one of a stator core or a rotor core.

8. The friction disk of claim 1, wherein the first wear liner includes at least three wear liner segments.

9. The friction disk of claim 1, wherein each of the multiple channels is defined by sidewalls that form an angle between 91 degrees and 155 degrees relative to the first surface of the friction disk core.

10. A friction disk comprising:
a friction disk core having a first surface and a second surface and including multiple channels extending radially across the first surface and the second surface, the multiple channels including first channels extending across the first surface and second channels extending across the second surface, the first channels being axially misaligned with the second channels;
a first wear liner configured to be coupled to the first surface of the friction disk core;
a second wear liner configured to be coupled to the second surface of the friction disk core; and
a plurality of fasteners,
wherein the first wear liner and the second wear liner each have an inner circumferential surface and an outer circumferential surface and include at least two wear liner segments that form an annular liner when coupled to the friction disk core, each of the two wear liner segments including a wear surface, a non-wear surface, and a rib extending from the non-wear surface from the inner circumferential surface to the outer circumferential surface, the rib defining at least one counterbore and configured to be received by one of the multiple channels, and
wherein each of one of the plurality of fasteners is configured to extend through the at least one counterbore of the rib of a respective wear liner segment of the at least two wear liner segments of the first wear liner and the second wear liner to couple the respective wear liner segment to the friction disk core.

11. The friction disk of claim 10, wherein each of the multiple channels is defined by sidewalls that have a converging shape along a radially inward direction of the friction disk core.

12. The friction disk of claim 10, wherein sidewalls of the rib are substantially perpendicular to a first non-wear surface.

13. The friction disk of claim 10, wherein a circumferential dimension of the rib decreases from an outer diameter of the first wear liner towards an inner diameter of the first wear liner.

14. The friction disk of claim 10, wherein the friction disk core includes a first material, and the first wear liner comprises a second material that is different from the first material.

15. The friction disk of claim 10, wherein the friction disk core is a rotor core.

16. The friction disk of claim 10, wherein the friction disk core is a stator core.

17. A multi-disk brake system comprising:
a plurality of rotors configured to rotate about an axis; and
a plurality of stators configured to remain stationary relative to the axis,
wherein at least one of the plurality of rotors or the plurality of stators includes:
a friction disk core having a first surface and a second surface with multiple channels extending radially across the first surface and the second surface, the multiple channels including first channels extending across the first surface and second channels extending across the second surface, the first channels being axially misaligned with the second channels,
a first wear liner having an inner circumferential surface, an outer circumferential surface, and at least two wear liner segments each configured to be coupled to the first surface of the friction disk core to form an annular liner and each including a wear surface, a non-wear surface, and a rib extending from the non-wear surface from the inner circumferential surface to the outer circumferential surface, the rib defining at least one counterbore and configured to be received by one of the multiple channels, and
a plurality of fasteners each configured to extend through the at least one counterbore of the rib of a respective wear liner segment of the at least two wear liner segments to couple the respective wear liner segment to the friction disk core.

18. The multi-disk brake system of claim 17, further comprising a second wear liner having identical features as the first wear liner and configured to be coupled to the second surface of the friction disk core.

19. The multi-disk brake system of claim 17, wherein a circumferential dimension of the rib decreases from an outer diameter of the first wear liner towards an inner diameter of the first wear liner.

20. The multi-disk brake system of claim 17, wherein the friction disk core includes a first material, and the first wear liner comprises a second material that is different from the first material.

* * * * *